(12) United States Patent
Chen

(10) Patent No.: US 11,563,746 B2
(45) Date of Patent: Jan. 24, 2023

(54) METHOD FOR CONFIGURING OPERATING TIME PERIOD FOR MAILBOX CONTENT AND INSTANT MESSAGING CONTENT IN SYSTEM

(71) Applicant: CHENGDU QIANNIUCAO INFORMATION TECHNOLOGY CO., LTD., Sichuan (CN)

(72) Inventor: Dazhi Chen, Meishan (CN)

(73) Assignee: CHENGDU QIANNIUCAO INFORMATION TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 16/635,989

(22) PCT Filed: Aug. 2, 2018

(86) PCT No.: PCT/CN2018/098398
§ 371 (c)(1),
(2) Date: Jan. 31, 2020

(87) PCT Pub. No.: WO2019/024903
PCT Pub. Date: Feb. 7, 2019

(65) Prior Publication Data
US 2021/0152562 A1      May 20, 2021

(30) Foreign Application Priority Data

Aug. 3, 2017  (CN) .......................... 201710658068.2

(51) Int. Cl.
*H04L 29/06*        (2006.01)
*H04L 9/40*         (2022.01)
*G06Q 10/10*        (2012.01)

(52) U.S. Cl.
CPC ......... *H04L 63/105* (2013.01); *G06Q 10/107* (2013.01); *H04L 63/00* (2013.01); *H04L 63/10* (2013.01); *H04L 63/108* (2013.01)

(58) Field of Classification Search
CPC ..... H04L 51/046; H04L 63/10; H04L 63/105; H04L 63/00; H04L 63/108; G06Q 10/107
See application file for complete search history.

(56) References Cited

U.S. PATENT DOCUMENTS

| 6,202,066 | B1 * | 3/2001 | Barkley | ............. G06F 21/6218 707/999.009 |
| 2002/0087646 | A1 * | 7/2002 | Hickey | ................ G06Q 10/107 709/206 |

(Continued)

FOREIGN PATENT DOCUMENTS

| CN | 1773413 A | 5/2006 |
| CN | 103166833 A | 6/2013 |

(Continued)

OTHER PUBLICATIONS

International Search Report in the international application No. PCT/CN2018/098398, dated Oct. 24, 2018.

(Continued)

*Primary Examiner* — Jason K Gee
(74) *Attorney, Agent, or Firm* — Ladas & Parry, LLP

(57) ABSTRACT

A method for setting an operation time range of mailbox content and instant messaging content in a system is disclosed in the present invention, wherein a method for setting an operation time of mailbox content includes: selecting a role, a user or an employee as a mailbox user; setting a permission time range for each mailbox user, wherein said permission time range includes one or more of the following types: a time range from a time point, which is determined by going backwards from a current time for a fixed time length, to the current time, a time range from a start time to (Continued)

a current time, a time range from a deadline to a system initial time, and a time range from a start time to a deadline; and the content within the permission time range of the mailbox user in a mailbox account used by the mailbox user being operated by said mailbox user. In the present invention, by setting a permission time range, only the content set within the permission time range in the mailbox account or the instant messaging account can be operated, thus improving the security of data information in the mailbox account and the instant messaging account.

16 Claims, 2 Drawing Sheets

(56) References Cited

U.S. PATENT DOCUMENTS

| | | | |
|---|---|---|---|
| 2004/0199514 A1* | 10/2004 | Rosenblatt | H04L 51/04 |
| 2007/0208857 A1* | 9/2007 | Danner | H04L 63/102 |
| | | | 709/226 |
| 2009/0313209 A1 | 12/2009 | Lu et al. | |
| 2012/0278426 A1 | 11/2012 | Nakagawa et al. | |
| 2014/0298198 A1* | 10/2014 | Kuchibhotla | G06F 40/166 |
| | | | 715/753 |

FOREIGN PATENT DOCUMENTS

| | | |
|---|---|---|
| CN | 103475712 A | 12/2013 |
| CN | 103516679 A | 1/2014 |
| CN | 104598778 A | 5/2015 |
| CN | 104660559 A | 5/2015 |
| CN | 105072180 A | 11/2015 |
| CN | 105303084 A | 2/2016 |
| CN | 106056292 A | 10/2016 |
| CN | 107508798 A | 12/2017 |
| CN | 107508800 A | 12/2017 |

OTHER PUBLICATIONS

Written Opinion of the International Searching Authority in the international application No. PCT/CN2018/098398 dated Oct. 24, 2018 with English translation provided by Google Translate.
First Office Action and Search Reports from CN 201810873926.X, dated Mar. 3, 2021, with English translation from Global Dossier, all pages.

* cited by examiner

METHOD FOR CONFIGURING OPERATING TIME PERIOD FOR MAILBOX CONTENT AND INSTANT MESSAGING CONTENT IN SYSTEM

CROSS-REFERENCE TO RELATED APPLICATIONS

This application is the U.S. national phase of PCT/CN2018/098398 filed on Aug. 2, 2018, which claims priority to Chinese Application No. 201710658068.2 filed on Aug. 3, 2017, the disclosures of which are incorporated by reference herein in their entireties.

BACKGROUND

Technical Field

The present invention relates to a time setting method for operation permissions in a management software system such as ERP, and in particular, to a method for setting an operation time range of mailbox content and instant messaging content in a system.

Related Art

In the conventional management software system such as ERP, during authorization for an employee, the employee is usually authorized according to the permissions of the employee's post. After obtaining the authorization of a certain mailbox account or instant messaging account, the employee can view all historical data/information and the current data/information in the mailbox account or the instant messaging account. However, it easily causes information leakage of the company in some cases. For example, a new employee takes up a post in the company, but is not desired to view the historical data/information in the mailbox account or the instant messaging account taken over by the employee (or the company only wants the employee to view data/information in a particular time range of the mailbox account or the instant messaging account, which cannot be achieved by the conventional authorization method). After obtaining the authorization of the mailbox account or the instant messaging account, the employee can view the historical data/information in the mailbox account or the instant messaging account, and in this case, the company cannot take effective restriction measures, thus leading to the data leakage of the company. For another example, when an employee is temporarily transferred to review the data within a period of time in a mailbox account or an instant messaging account of another post, the permission to view the mailbox account or the instant messaging account needs to be authorized to the employee. After obtaining the authorization, the employee can view all data/information in the mailbox account or the instant messaging account, causing the leakage of other data in addition to the to-be-reviewed data in the mailbox account or the instant messaging account. Therefore, it can be learned that the existing method for authorizing the permission to view the mailbox account or the instant messaging account cannot achieve permission control effectively in some cases, which is adverse to information security of the company and easily causes loss to the company.

When an employee/a user is recruited or transferred from a post, every time a mailbox account and an instant messaging account need to be related to the employee/user (manually relating the mailbox account to the employee/user has obvious disadvantages: in relation processes repeated for a long time, it occurs easily that after the mailbox is related to the employee/user, respective working ranges corresponding to both the employee/user and the mailbox are greatly deviated and even incorrect, but the mailbox has been put into use or even has been in use for a relatively long time or a very long time, which causes great inconvenience and trouble to subsequent work and immeasurable losses; similarly, manually relating the instant messaging account to the employee/user also has these disadvantages), which involves large workloads (and the relation may be incorrect). Moreover, re-relating the mailbox account and/or the instant messaging account to the employee causes delay in some degree, which affects the normal operation of related work. For example, when an employee A is transferred from a production supervisor to a sales supervisor, after the current mailbox of the employee A is handed over to his/her successor, if no new mailbox is related to the employee A, the employee A does not have any mailbox and fails to carry out corresponding work. If the current mailbox of the employee A is not handed over to his/her successor, the successor cannot know previous related email information, which is adverse to the operation of the work. For another example, the employee A who has held both posts of the production supervisor and the after-sales supervisor, now no longer takes up the post of the production supervisor (the employee A's mailbox cannot be given to his/her successor, because it also contains work emails of the after-sales supervisor). If a new mailbox is assigned to the successor of the production supervisor, it is also necessary to notify the related personnel (for example, equipment maintenance personnel and outsourcing manufacturers), which not only involves large workloads but also causes extra work to the other party. Moreover, the employee A may still view production-type emails generated subsequently (for example, an email sender does not know the resignation of the employee A from the post of the production supervisor). For another example, when the employee A is transferred from the production supervisor to the sales supervisor, if a new mailbox is not assigned to the employee A immediately after the current mailbox of the employee A is handed over to his/her successor, the employee A cannot view the emails related to the original sales work during this period, which is adverse to the normal operation of the work (the conventional authorization management for an instant messaging account also has the problems described above).

The application of the "relation time of a mailbox account and its currently-related mailbox user" has the following advantages: If the enterprise wants to set operation permissions for the operator by using the relation time as a reference time point, for example, if the company stipulates, due to the management requirement, that after the currently-related person of the operated mailbox account is related to the mailbox, the currently-related person can only operate the content within a time range before or after the relation time, or within a time range from the relation time to a specified time in the mailbox, or the like; or some supervisors are also authorized to operate content in the operated mailbox account related to a supervisee in such a manner but the relation time is dynamic (many factors such as induction, transfer, and resignation of employees will increase the uncertainty of the relation time, and thus the "relation time" of the operated mailbox account and its currently-related person is uncertain). Therefore, the operation permissions cannot be set according to the conventional methods. However, the method in the present application can perfectly solve such a problem. The application of the "relation time of a mailbox user and his/her currently-related mailbox account" has similar advantages.

The application of the "relation time of an instant messaging account and its currently-related instant messaging user" has the following advantages: If the enterprise wants to set operation permissions for the operator by using the relation time as a reference time point, for example, if the company stipulates, due to the management requirement, that after the currently-related person of the operated instant messaging account is related to the instant messaging account, the currently-related person can only operate the content within a time range before or after the relation time, or within a time range from the relation time to a specified time in the instant messaging account, or the like; or some supervisors are also authorized to operate content in the operated instant messaging account related to a supervisee in such a manner but the relation time is dynamic (many factors such as induction, transfer, and resignation of employees will increase the uncertainty of the relation time, and thus the "relation time" of the operated instant messaging account and its currently-related person is uncertain). Therefore, the operation permissions cannot be set according to the conventional methods. However, the method in the present application can perfectly solve such a problem. The application of the "relation time of an instant messaging user and his/her currently-related instant messaging account" has similar advantages.

In addition, a mailbox account or an instant messaging account is used by different persons successively, which causes information leakage. For example, a mailbox A that contains lots of confidential research and development information is assigned to an employee A in a research and development department initially. After the employee A resigns, the mailbox A is further assigned to an employee B in a sales department. In this case, the employee B can view the original confidential research and development information in the mailbox A. Moreover, an information sender (such as an email information sender and a communication information sender) is unwilling to send information to a mailbox account and an instant messaging account whose user changes constantly, because it easily causes information leakage. For example, after an employee is late for work, his/her supervisor does not deduct his/her salary in view of the employee's job performance, and sends an email to the employee for illustration. If the employee's mailbox is later used by others, this email will be known by the others, which is adverse to the management of the company.

SUMMARY

Technical Problems

The object of the present invention is to overcome the deficiencies of the prior art, and provide a method for setting an operation time range of mailbox content and instant messaging content in a system. By setting a permission time range, only content within the set permission time range in the mailbox account or the instant messaging account can be operated, thus reducing the possibility of data information leakage of the mailbox account and the instant messaging account, and improving the security of data information in the mailbox account and the instant messaging account.

Solutions to Problems

Technical Solutions

The object of the present invention is achieved by the following technical solutions: A method for setting an operation time range of mailbox content in a system includes: selecting a role, a user or an employee as a mailbox user; setting a permission time range for each mailbox user, wherein said permission time range includes one or more of the following four types: a time range from a time point, which is determined by going backwards from a current time for a fixed time length, to the current time, a time range from a start time to a current time, a time range from a deadline to a system initial time, and a time range from a start time to a deadline; and the content within the permission time range in a mailbox account related to the mailbox user being operated by said mailbox user.

Preferably, said role is an independent individual not a group/a class, and during the same period, one role can only be related to a unique user, while one user is related to one or more roles.

A method for setting an operation time range of mailbox content in a system includes: setting a permission time range for a mailbox account, wherein said permission time range includes one or more of the following four types: a time range from a time point, which is determined by going backwards from a current time for a fixed time length, to the current time, a time range from a start time to a current time, a time range from a deadline to a system initial time, and a time range from a start time to a deadline; and the content within the permission time range of the mailbox account in the mailbox account being operated by all roles, users and employees using the mailbox account.

A method for setting an operation time range of mailbox content in a system includes:

(1) selecting a role, a user, or an employee as a supervisor;

(2) setting one or more supervisees for each supervisor, wherein said supervisee is a role, a user or an employee;

(3) setting a permission time range for each supervisor, wherein said permission time range includes one or more of the following four types: a time range from a time point, which is determined by going backwards from a current time for a fixed time length, to the current time, a time range from a start time to a current time, a time range from a deadline to a system initial time, and a time range from a start time to a deadline; and (4) the content within the permission time range of the supervisor in a mailbox account used by the corresponding supervisee being operated by each supervisor.

Step (1) to step (4) are performed sequentially, or step (1), step (3), step (2), and step (4) are performed sequentially.

A method for setting an operation time range of mailbox content in a system includes: selecting a role, a user, or an employee as a supervisee; setting a permission time range for each supervisee, wherein said permission time range includes one or more of the following four types: a time range from a time point, which is determined by going backwards from a current time for a fixed time length, to the current time, a time range from a start time to a current time, a time range from a deadline to a system initial time, and a time range from a start time to a deadline; and operating, by all supervisors corresponding to each supervisee, content within the permission time range of the supervisee in a mailbox account used by the supervisee.

A method for setting an operation time range of mailbox content in a system includes: selecting a role, a user, or an employee as a mailbox user; setting a permission time range for each mailbox user, wherein said permission time range includes one or more of the following four types: a time range from a time point, which is determined by going backwards from a relation time of the mailbox user and his/her currently-related mailbox account for a fixed time length, to a current time, a time range from a time point, which is determined by going forwards from a relation time of the mailbox user and his/her currently-related mailbox account for a fixed time length, to a system initial time, a time range from a relation time of the mailbox user and his/her currently-related mailbox account to a system initial time, and a time range from a relation time of the mailbox user and his/her currently-related mailbox account to a current time; and operating, by said mailbox user, content within the permission time range of the mailbox user in a mailbox account used by the mailbox user.

A method for setting an operation time range of mailbox content in a system includes: setting a permission time range for a mailbox account, wherein said permission time range includes one or more of the following four types: a time range from a time point, which is determined by going backwards from a relation time of the mailbox account and its currently-related mailbox user for a fixed time length, to a current time, a time range from a time point, which is determined by going forwards from a relation time of the mailbox account and its currently-related mailbox user for a fixed time length, to a system initial time, a time range from a relation time of the mailbox account and its currently-related mailbox user to a system initial time, and a time range from a relation time of the mailbox account and its currently-related mailbox user to a current time; and the content within the permission time range of the mailbox account in the mailbox account being operated by all roles, users and employees using the mailbox account.

A method for setting an operation time range of mailbox content in a system includes:

(1) selecting a role, a user or an employee as a supervisor;
(2) setting one or more supervisees for each supervisor, wherein said supervisee is a role, a user or an employee;
(3) setting a permission time range for each supervisor, wherein said permission time range includes one or more of the following four types: a time range from a time point, which is determined by going backwards from a relation time of the mailbox user and his/her currently-related mailbox account for a fixed time length, to a current time, a time range from a time point, which is determined by going forwards from a relation time of the mailbox user and his/her currently-related mailbox account for a fixed time length, to a system initial time, a time range from a relation time of the mailbox user and his/her currently-related mailbox account to a system initial time, and a time range from a relation time of the mailbox user and his/her currently-related mailbox account to a current time; and
(4) the content within the permission time range of the supervisor in a mailbox account used by the corresponding supervisee being operated by each supervisor.

Step (1) to step (4) are performed sequentially, or step (1), step (3), step (2), and step (4) are performed sequentially.

A method for setting an operation time range of mailbox content in a system includes: selecting a role, a user or an employee as a supervisee; setting a permission time range for each supervisee, wherein said permission time range includes one or more of the following four types: a time range from a time point, which is determined by going backwards from a relation time of the mailbox user and his/her currently-related mailbox account for a fixed time length, to a current time, a time range from a time point, which is determined by going forwards from a relation time of the mailbox user and his/her currently-related mailbox account for a fixed time length, to a system initial time, a time range from a relation time of the mailbox user and his/her currently-related mailbox account to a system initial time, and a time range from a relation time of the mailbox user and his/her currently-related mailbox account to a current time; and the content within the permission time range of the supervisee in a mailbox account used by the supervisee being operated by all supervisors corresponding to each supervisee.

A method for setting an operation time range of instant messaging content in a system includes: selecting a role, a user or an employee as an instant messaging user; setting a permission time range for each instant messaging user, wherein said permission time range includes one or more of the following four types: a time range from a time point, which is determined by going backwards from a current time for a fixed time length, to the current time, a time range from a start time to a current time, a time range from a deadline to a system initial time, and a time range from a start time to a deadline; and operating, by said instant messaging user, content within the permission time range of the instant messaging user in an instant messaging account used by the instant messaging user.

Preferably, said role is an independent individual not a group/a class, and during the same period, one role can only be related to a unique user, while one user is related to one or more roles.

A method for setting an operation time range of instant messaging content in a system includes: setting a permission time range for an instant messaging account, wherein said permission time range includes one or more of the following four types: a time range from a time point, which is determined by going backwards from a current time for a fixed time length, to the current time, a time range from a start time to a current time, a time range from a deadline to a system initial time, and a time range from a start time to a deadline; and the content within the permission time range of the instant messaging account in the instant messaging account being operated by all roles, users and employees using the instant messaging account.

A method for setting an operation time range of instant messaging content in a system includes:

(1) selecting a role, a user or an employee as a supervisor;
(2) setting one or more supervisees for each supervisor, wherein said supervisee is a role, a user or an employee;
(3) setting a permission time range for each supervisor, wherein said permission time range includes one or more of the following four types: a time range from a time point, which is determined by going backwards from a current time for a fixed time length, to the current time, a time range from a start time to a current time, a time range from a deadline to a system initial time, and a time range from a start time to a deadline; and
(4) the content within the permission time range of the supervisor in an instant messaging account used by the corresponding supervisee being operated by each supervisor.

Step (1) to step (4) are performed sequentially, or step (1), step (3), step (2), and step (4) are performed sequentially.

A method for setting an operation time range of instant messaging content in a system includes: selecting a role, a user or an employee as a supervisee; setting a permission time range for each supervisee, wherein said permission time range includes one or more of the following four types: a time range from a time point, which is determined by going backwards from a current time for a fixed time length, to the current time, a time range from a start time to a current time, a time range from a deadline to a system initial time, and a time range from a start time to a deadline; and the content within the permission time range of the supervisee in an instant messaging account used by the supervisee being operated by all supervisors corresponding to each supervisee.

A method for setting an operation time range of instant messaging content in a system includes: selecting a role, a user or an employee as an instant messaging user; setting a permission time range for each instant messaging user, wherein said permission time range includes one or more of the following four types: a time range from a time point, which is determined by going backwards from a relation time of the instant messaging user and his/her currently-related instant messaging account for a fixed time length, to a current time, a time range from a time point, which is determined by going forwards from a relation time of the instant messaging user and his/her currently-related instant messaging account for a fixed time length, to a system initial time, a time range from a relation time of the instant messaging user and his/her currently-related instant messaging account to a system initial time, and a time range from a relation time of the instant messaging user and his/her currently-related instant messaging account to a current time; and the content within the permission time range of the instant messaging user in an instant messaging account used by the instant messaging user being operated by said instant messaging user.

A method for setting an operation time range of instant messaging content in a system includes: setting a permission time range for an instant messaging account, wherein said permission time range includes one or more of the following four types: a time range from a time point, which is determined by going backwards from a relation time of the instant messaging account and its currently-related instant messaging user for a fixed time length, to a current time, a time range from a time point, which is determined by going forwards from a relation time of the instant messaging account and its currently-related instant messaging user for a fixed time length, to a system initial time, a time range from a relation time of the instant messaging account and its currently-related instant messaging user to a system initial time, and a time range from a relation time of the instant messaging account and its currently-related instant messaging user to a current time; and the content within the permission time range of the instant messaging account in the instant messaging account being operated by all roles, users, and employees using the instant messaging account.

A method for setting an operation time range of instant messaging content in a system includes:

(1) selecting a role, a user or an employee as a supervisor;
(2) setting one or more supervisees for each supervisor, wherein said supervisee is a role, a user or an employee;
(3) setting a permission time range for each supervisor, wherein said permission time range includes one or more of the following four types: a time range from a time point, which is determined by going backwards from a relation time of the instant messaging user and his/her currently-related instant messaging account for a fixed time length, to a current time, a time range from a time point, which is determined by going forwards from a relation time of the instant messaging user and his/her currently-related instant messaging account for a fixed time length, to a system initial time, a time range from a relation time of the instant messaging user and his/her currently-related instant messaging account to a system initial time, and a time range from a relation time of the instant messaging user and his/her currently-related instant messaging account to a current time; and (4) the content within the permission time range of the supervisor in an instant messaging account used by the corresponding supervisee being operated by each supervisor.

Step (1) to step (4) are performed sequentially, or step (1), step (3), step (2), and step (4) are performed sequentially.

A method for setting an operation time range of instant messaging content in a system includes: selecting a role, a user or an employee as a supervisee; setting a permission time range for each supervisee, wherein said permission time range includes one or more of the following four types: a time range from a time point, which is determined by going backwards from a relation time of the instant messaging user and his/her currently-related instant messaging account for a fixed time length, to a system initial time, a time range from a relation time of the instant messaging user and his/her currently-related instant messaging account to a system initial time, and a time range from a relation time of the instant messaging user and his/her currently-related instant messaging account to a current time; and the content within the permission time range of the supervisee in an instant messaging account used by the supervisee being operated by all supervisors corresponding to each supervisee.

The "relation time" in the "relation time of the mailbox account and its currently-related mailbox user", the "relation time of the mailbox user and his/her currently-related mailbox account", the "relation time of the instant messaging account and its currently-related instant messaging user", and the "relation time of the instant messaging user and his/her currently-related instant messaging account" specifically refers to the "last relation time", if the "relation time" in the "relation time of the instant messaging account and its currently-related instant messaging user" is more than one (it is possible that the instant messaging account has been related to the instant messaging user before), only the last relation time is used automatically.

Beneficial Effects of the Invention

Beneficial Effects

The present invention has the following beneficial effects:
(1) In the present invention, when an employee/a user uses an instant messaging account/a mailbox account (an instant messaging account/a mailbox account related to the employee, or the instant messaging account/the mailbox account related to a user corresponding to the employee, or the instant messaging account/the mailbox account related to the user, or the instant messaging account/the mailbox account related to a role which is related to the user corresponding to the employee, or the instant messaging account/the mailbox account related to a role which is related to the user), the content in the instant messaging account/the mailbox account used by the employee/user is operated based on the "permission time range set for the employee/user". It is unnecessary to set an operation permission time range for the mailbox account/the instant messaging account used by the employee/user. If a new instant messaging account/a mailbox account needs to be used when the employee/user is transferred from a post, it is also unnecessary to set the operation permission time range for the content in the instant messaging account/the mailbox account (moreover, it is also unnecessary to set the operation permission time range of the instant messaging account/the mailbox account again when the employee/user is not transferred from the post but uses a new instant messaging account/a mailbox account or a new instant messaging account/a mailbox account is added).

(2) In the present invention, when an employee/a user uses an instant messaging account/a mailbox account (the instant messaging account/the mailbox account related to the employee, or the instant messaging account/the mailbox account related to a user corresponding to the employee, or the instant messaging account/the mailbox account related to the user, or the instant messaging account/the mailbox account related to a role which is related to the user corresponding to the employee, or the instant messaging account/the mailbox account related to a role which is related to the user), the employee operates the content in the instant messaging account/the mailbox account used by the employee based on the "permission time range set for the user corresponding to the employee", or the employee operates the content in the instant messaging account/the mailbox account used by the employee based on the "permission time range set for the role related to the user corresponding to the employee", or the user operates the content in the instant messaging account/the mailbox account used by the user based on the "permission time range set for the employee corresponding to the user", or the user operates the content in the instant messaging account/ the mailbox account used by the user based on the "permission time range set for the role related to the user". It is unnecessary to set an operation permission time range for the mailbox account/the instant messaging account used by the employee/user. If a new instant messaging account/a mailbox account needs to be used when the employee/user is transferred from a post, it is also unnecessary to set the operation permission time range for the content in the instant messaging account/the mailbox account (moreover, it is also unnecessary to set the operation permission time range of the instant messaging account/the mailbox account again when the employee/user is not transferred from the post but uses a new instant messaging account/a mailbox account or a new instant messaging account/a mailbox account is added). The employee's operation or the user's operation on the content in the instant messaging account/the mailbox account can be controlled by using the permission time range of the role related to the user corresponding to the employee or the permission time range of the role related to the user.

(3) In the present invention, when an employee/a user/a role, as a supervisor, uses an instant messaging account/a mailbox account of a supervisee (which is not the instant messaging account/the mailbox account related to the employee, not the instant messaging account/the mailbox account related to a user corresponding to the employee, not the instant messaging account/the mailbox account related to the user, not the instant messaging account/the mailbox account related to a role which is related to the user corresponding to the employee, not the instant messaging account/the mailbox account related to a role which is related to the user, not the instant messaging account/the mailbox account related to an employee corresponding to the user, and not the instant messaging account/the mailbox account related to the role, wherein the employee, user, and role are the supervisors), the employee serving as the supervisor operates the content in the instant messaging account/the mailbox account used by the supervisee based on the "permission time range set for the supervisor identity of the employee", or the user serving as the supervisor operates the content in the instant messaging account/the mailbox account used by the supervisee based on the "permission time range set for the supervisor identity of the user", or the role serving as the supervisor operates the content in the instant messaging account/the mailbox account used by the supervisee based on the "permission time range set for the supervisor identity of the role", or the employee/user serving as the supervisor operates the content in the instant messaging account/the mailbox account used by the supervisee based on the "permission time range set for the supervisor identity of the role which is related to the user corresponding to the employee or the role related to the user". It is unnecessary to set an operation permission time range of the content in the instant messaging account/the mailbox account corresponding to or related to the supervised role. By setting the operation permission time range of the content in the instant messaging account/the mailbox account for the supervisor, when the supervisor supervises the instant messaging accounts/mailbox accounts of the supervisees, the permission time ranges of the content in the supervisees' instant messaging accounts/mailbox accounts are all operated based on the operation permission time range set for the supervisor.

(4) In the present invention, an employee/a user/a role serves as a supervisee, and when a "supervisor" uses an instant messaging account/a mailbox account of the "supervisee" (the instant messaging account/the mailbox account related to the "supervised" employee, the instant messaging account/the mailbox account related to a user corresponding to the employee, the instant messaging account/the mailbox account related to the user, the instant messaging account/ the mailbox account related to a role which is related to the user corresponding to the "supervised" employee, the instant messaging account/the mailbox account related to a role which is related to the user, the instant messaging account/ the mailbox account related to an employee corresponding to the user, and the instant messaging account/the mailbox account related to the role), the supervisor operates the content in the instant messaging account/the mailbox account used by the supervised employee based on the "permission time range set for the supervisee identity of the supervised employee", or the supervisor operates the content in the instant messaging account/the mailbox account used by the supervised user based on the "permission time range set for the supervisee identity of the supervised user", or the supervisor operates the content in the instant messaging account/the mailbox account used by the user related to the role or the employee corresponding to the user related to the role based on the "permission time range set for the supervisee identity of the supervised role".

For example, it is set that an employee Zhang San can operate his/her related instant messaging account/mailbox account within the last one year, Zhang San can operate, as a supervisor, a supervisee's instant messaging account/ mailbox account within last two years, and when Zhang San serves as a supervisee, his/her instant messaging account/ mailbox account can be operated by the supervisee within last three years. If the supervisees corresponding to Zhang San are Li Si, Wang Wu, and Zhao Liu, Zhang San can operate content within the last two years in the instant messaging accounts/mailbox accounts related to Li Si, Wang Wu, and Zhao Liu, while Zhang San can only view/operate the content within the last one year in the instant messaging account/the mailbox account related to himself/herself. When Zhang San is a supervisee, the supervisor corresponding to him/her can only operate the content within the last three years in the instant messaging account/the mailbox account related to Zhang San.

(5) The conventional permission management mechanism defines the nature of a group, a type of work, a class or the like as the role. The role is in a one-to-many relation to the user. In the actual process of using a system, the user's permissions often need to be adjusted during the operation process. For example, in processing the change of an employee's permissions, when the permissions of an employee related to the role have changed, it is improper to change the permissions of the entire role due to the change of the permissions of the individual employee, because this role is also related to other employees whose permissions remain unchanged. To deal with this situation, either a new role is created to fit the employee whose permissions have changed, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

However, under the method of the present application, as the role is an independent individual, the object can be achieved by changing the permissions of the role. Although the method in the present application seems to increase the workload during system initialization, by means of copying or the like, the role can be created or authorized more efficiently than the conventional roles having the nature of a group. As it is unnecessary to consider the commonality of the roles having the nature of a group when satisfying the related users, the solutions in the present application make the permission setting clear and explicit. Especially after the system has been used for a period of time (after the permissions of the user/role have changed dynamically), the solutions in the present application can significantly improve the efficiency of permission management for the system user in using the system, make the dynamic authorization simpler, more convenient, clearer and more explicit, and improve the efficiency and reliability of the permission setting.

(6) The conventional group-based role authorization method is prone to errors. The method provided in the present application significantly reduces the probability of authorization errors, because the method of the present application only needs to consider the role as an independent individual, without considering the commonality of multiple users related to the role having the nature of a group under the conventional method. Even if errors occur in authorization, only the user related to the role is affected. However, in the case of the conventional role having the nature of a group, all users related to the role are affected. Even if errors occur in authorization, the correction method in the present application is simple and takes a short time, while in the case of the conventional role having the nature of a group, the commonality of the permissions of all users related to the role needs to be considered during correcting the errors. The modification is cumbersome, complex, and error-prone when there are many function points, and in many cases, the problem cannot be solved unless a new role is created.

(7) In the conventional group-based role authorization method, if the role has many permission function points, as time goes by, it is difficult to remember the specific permissions of the role, and it is even more difficult to remember the permission differences between roles with similar permissions. If a new user needs to be related, it cannot be accurately determined how to select a relation. In the method of the present application, the role itself has the nature of a post number/a station number, such that the selection can be made easily.

(8) When a user is transferred from a post, if many permissions of the transferred user need to be assigned to other users, in processing, it is necessary to distinguish the permissions of the transferred user and create roles to relate to other users respectively. The operations are complicated, time-consuming, and prone to errors.

The method in the present application is as follows: The transferred user is related to several roles. When the user is transferred, the relation between the user and the roles in the original department is first canceled (the canceled roles may be re-related to other users), and then the user is related to a role in a new department. The operation is simple and not error-prone.

(9) A department needs to be selected when or after a role is created. Once the department is selected for the role, the department cannot be replaced. Reasons why the department to which the role belongs cannot be replaced are as follows: Reason 1: As the role in the present application is equivalent to a station number or a post number in nature, different station numbers or post numbers have different work content or permissions. For example, the role of a salesperson 1 under a sales department and the role of a developer 1 under a technical department are two completely different station numbers or post numbers, and have different permissions. Reason 2: If the department (sales department) to which the role of the salesperson 1 belongs is replaced by the technical department without changing the permissions of the role of the salesperson 1, the role that owns the permissions of the sales department exists in the technical department. This leads to management confusion and security vulnerabilities.

BRIEF DESCRIPTION OF THE DRAWINGS

Description of the Drawings

Figure 1:
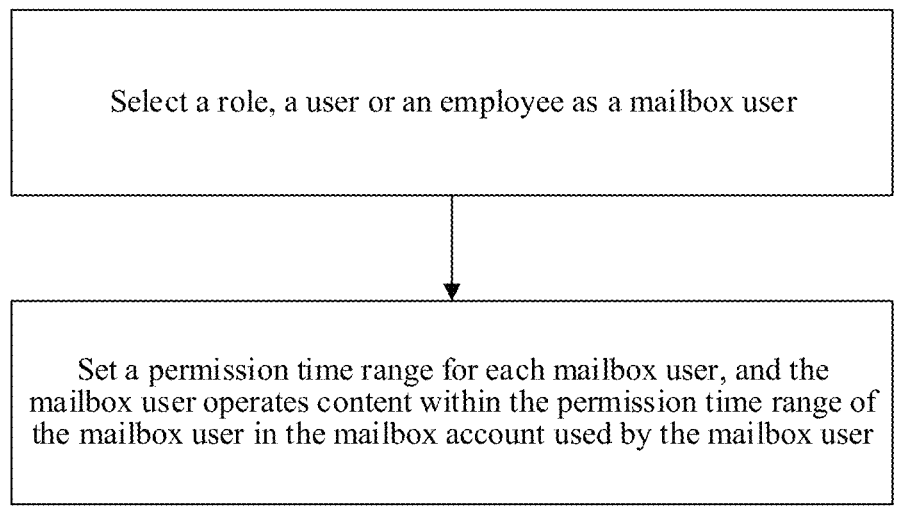
Figure 2:
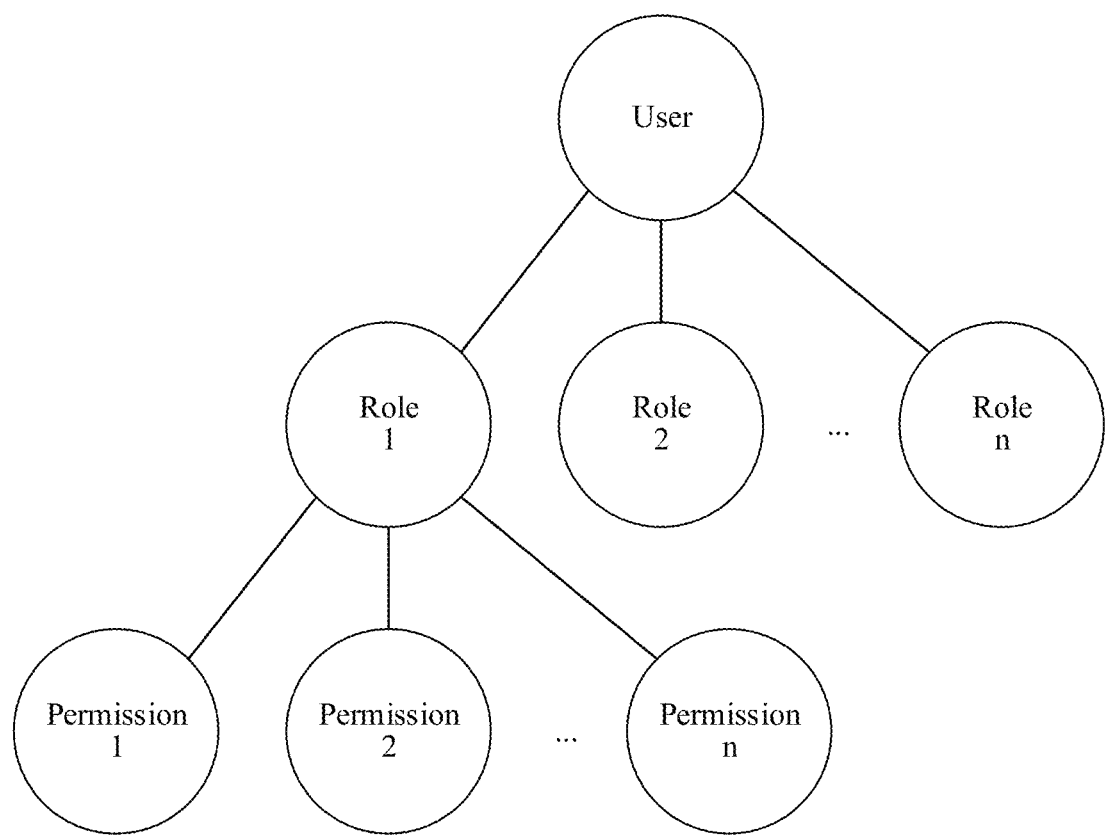
Figure 3:
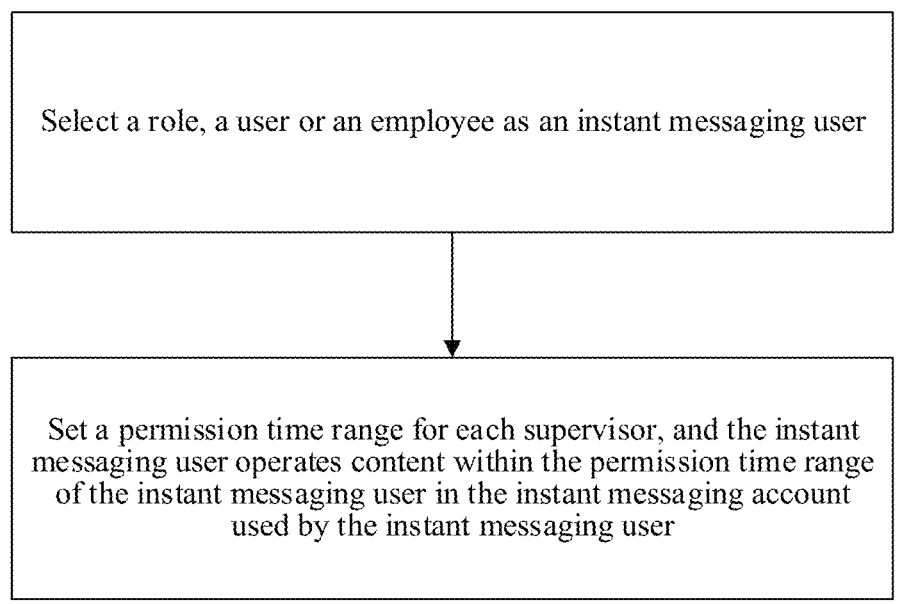

FIG. 1 is a flowchart of an embodiment of a method for setting an operation time of mailbox content in the present invention;

FIG. 2 is a schematic diagram of authorizing a user through a role having the nature of an independent individual in the present invention; and FIG. 3 is a flowchart of an embodiment of a method for setting an operation time of instant messaging content in the present invention.

OPTIMAL EMBODIMENTS FOR IMPLEMENTING THE INVENTION

Optimal Embodiments of the Invention

Embodiments

The technical solutions of the present invention will be further described in detail below with reference to the figures, but the protection scope of the present invention is not limited to the following descriptions.

[Embodiment 1] As shown in FIG. 1, a method for setting an operation time range of mailbox content in a system includes the following steps. S001: selecting a role, a user or an employee as a mailbox user.

After the relation between a role and a mailbox account is created, during the same period, one role can only be related to one mailbox account, and one mailbox account can only be related to one role. After the relation between a user and a mailbox account is created, during the same period, one user can only be related to one mailbox account, and one mailbox account can only be related to one user. After the relation between an employee and a mailbox account is created, during the same period, one employee can only be related to one mailbox account, and one mailbox account can only be related to one employee.

As shown in FIG. 2, the role is an independent individual not a group/a class, and during the same period, one role can only be related to a unique user, while one user is related to one or more roles. The user obtains the permissions of the related role. When or after a role is created, a department is selected for the role, and therefore the role belongs to the department. The role is authorized according to the work content of the role; the name of the role is unique under the department, and the number of the role is unique in the system.

Definition of a role: A role does not have the nature of a group/a class/a category/a post/a position/a type of work or the like, but has a non-collective nature. The role is unique and is an independent individual. Applied in an enterprise or an institution, the role is equivalent to a post number (the post number herein is not a post, and one post may have multiple employees at the same time, but one post number can only correspond to one employee during the same period).

For example, in a company system, the following roles may be created: a general manager, a deputy general manager 1, a deputy general manager 2, a manager of Beijing sales department I, a manager of Beijing sales department II, a manager of Beijing sales department III, a Shanghai sales engineer 1, a Shanghai sales engineer 2, a Shanghai sales engineer 3, a Shanghai sales engineer 4, a Shanghai sales engineer 5, and the like. The relation between users and roles is as follows: if Zhang San, the company's employee (the system sets a user Zhang San for Zhang San), serves as a deputy general manager 2 of the company and also serves as a manager of Beijing sales department I, the roles to which Zhang San needs to be related are the deputy general manager 2 and the manager of Beijing sales department I, and Zhang San owns the permissions of the two roles.

The concept of conventional roles is a group/a class/a post/a position/a type of work in nature, and one role can correspond to multiple users. However, in the present application, the concept of "role" is equivalent to a post number/a station number, and is also similar to the role in a film and television drama: one role (in childhood, juvenile, middle-age . . . ) can be played by only one actor or actress during the same period, but one actor or actress may play multiple roles.

When a user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) the permissions through a role related to his/her corresponding user.

S002: setting a permission time range for each mailbox user, wherein the permission time range includes one or more of the following four types: a time range from a time point, which is determined by going backwards from a current time for a fixed time length, to the current time, a time range from a start time to a current time, a time range from a deadline to a system initial time, and a time range from a start time to a deadline.

Furthermore, the permission time range further includes a time range from a system initial time to a current time.

The unit for setting the permission time range may be year, month, day, hour, minute, second, and the like.

The above five types of time ranges are described in the following examples: a time range from a time point, which is determined by going backwards from a current time for a fixed time length, to the current time. For example, on Jun. 20, 2017, an employee A is authorized to view email data/content within a time range from a time point, which is determined by going backwards 6 days from Jun. 20, 2017, to Jun. 20, 2017 (which is the current time, what is authorized is "till the current time" not a specific time point) in a mailbox account used by the employee A. That is, on Jun. 20, 2017, the employee A can view email data/content from Jun. 15, 2017 to Jun. 20, 2017 in the mailbox account used by the employee A; on Jun. 21, 2017, the employee A can view email data/content from Jun. 16, 2017 to Jun. 21, 2017 in the mailbox account used by the employee A; on Jun. 22, 2017, the employee A can view email data/content from Jun. 17, 2017 to Jun. 22, 2017 in the mailbox account used by the employee A, and so on. That is, the time length of the time range is fixed, and the start time and the deadline are both variable automatically.

The time range from a start time to a current time (the current time is dynamic). For example, on May 1, 2015, the employee A is authorized to view email data/content from Feb. 1, 2015 to the current date (current time) in the mailbox account used by the employee A. Then, the employee A can view email data/content from Feb. 1, 2015 to May 1, 2015 in the mailbox account used by the employee A; on May 2, 2015, the employee A can view email data/content from Feb. 1, 2015 to May 2, 2015 in the mailbox account used by the employee A (further, the start time can be defined as excluding the start time, and when the start time is excluded, the employee A cannot view email data/content on Feb. 1, 2015 in the mailbox account used by the employee A, and can only view email data/content after Feb. 1, 2015 in the mailbox account used by the employee A; further, other time ranges in the present application, if related to the definition of the start time, may also exclude the start time).

The time range from a deadline to a system initial time. For example, the employee A is authorized to view email data/content from Feb. 1, 2015 to the system initial time in the mailbox account used by the employee A. Then, the employee A can view email data/content from Feb. 1, 2015 to the system initial time in the mailbox account used by the employee A (that is, the employee A can view email data/content on and before Feb. 1, 2015 in the mailbox account used by the employee A in the system); (further, the deadline can be defined as excluding the deadline, and when the deadline is excluded, the employee A cannot view email data/content on Feb. 1, 2015 in the mailbox account used by the employee A, but can only view email data/content before Feb. 1, 2015 in the mailbox account used by the employee A; furthermore, the system initial time may not be set and only the deadline is set, and in this case, the employee A can view email data/content on and before the deadline in the mailbox account used by the employee A, or the employee A can view email data/content before the deadline in the mailbox account used by the employee A).

The time range from a start time to a deadline. For example, the employee A is authorized to view email data/content from Feb. 1, 2015 to Jun. 1, 2015 in the mailbox account used by the employee A. Then, the employee A can view email data/content from Feb. 1, 2015 to Jun. 1, 2015 in the mailbox account used by the employee A.

The time range from a system initial time to a current time (the current time is dynamic). For example, on Jun. 1, 2017, the employee A is authorized to view email data/content from the system initial time to the current time in the mailbox account used by the employee A. Then, on Jun. 1, 2017, the employee A can view email data/content from the system initial time to Jun. 1, 2017 in the mailbox account used by the employee A; on Jun. 2, 2017, the employee A can view email data/content from the system initial time to Jun. 2, 2017 in the mailbox account used by the employee A, and so on. Further, the system initial time may not be set, and in this case, the time range from the system initial time to the current time is a time range including all time. Further, if other time ranges in the present application relate to the definition of the system initial time, the system initial time may not be set either.

Both the deadline and the start time are set manually.

In the above description, the permission time range is set for the employee A rather than the mailbox account. After the permission time range is set for the employee A, the employee A can only operate the content within the permission time range set for the employee A in the mailbox used by himself/herself. The employee A uses a mailbox A now, and later the employee A uses a mailbox B instead of the mailbox A. In this case, the employee A can only operate the content within the permission time range set for the employee A in the mailbox B.

The mailbox user operates the content within the permission time range of the mailbox user in the mailbox account used by the mailbox user. The operation herein specifically includes one or more types of viewing data/content, and deleting data/content.

Further, the mailbox user can and is only allowed to operate the content within the permission time range (or within the permission time range of the mailbox user) in the mailbox account used by the mailbox user.

When the mailbox user is a role, the mailbox account used by the mailbox user includes a mailbox account related to the role; when the mailbox user is a user, the mailbox account used by the mailbox user includes a mailbox account related to the user, a mailbox account related to an employee corresponding to the user, and a mailbox account related to a role which is related to the user; when the mailbox user is an employee, the mailbox account used by the mailbox user includes a mailbox account related to the employee, a mailbox account related to a user corresponding to the employee, and a mailbox account related to a role which is related to the user corresponding to the employee.

The source of the mailbox account includes one or two of the following two types: 1. The mailbox account is a mailbox account of a mailbox application (software) in the system (that is, a mailbox account in the system), and a step of creating the mailbox account is further included in this case. 2. The mailbox account is a mailbox account of a mailbox service provided by a third party, for example, a Netease mailbox account, a QQ mailbox account, or the like. The system herein is a management system used in an enterprise, an institution or the like. The mailbox application in the system is only a part of the system, but not the main part of the system.

[Embodiment 2] A method for setting an operation time range of mailbox content in a system includes the following steps. S011: setting a permission time range for a mailbox account (rather than setting a time range for a mailbox user), wherein the permission time range includes one or more of the following four types: a time range from a time point, which is determined by going backwards from a current time for a fixed time length, to the current time, a time range from a start time to a current time, a time range from a deadline to a system initial time, and a time range from a start time to a deadline;

Furthermore, the permission time range further includes a time range from a system initial time to a current time.

The unit for setting the permission time range may be year, month, day, hour, minute, second, and the like.

The source of the mailbox account includes one or two of the following two types: 1. The mailbox account is a mailbox account of a mailbox application (software) in the system (that is, a mailbox account in the system), and a step of creating the mailbox account is further included in this case. 2. The mailbox account is a mailbox account of a mailbox service provided by a third party, for example, a Netease mailbox account, a QQ mailbox account, or the like. The system herein is a management system used in an enterprise, an institution or the like. The mailbox application in the system is only a part of the system, but not the absolute main part of the system.

S012: the content within the permission time range of the mailbox account in the mailbox account being operated by all roles, users and employees using the mailbox account. The operation herein specifically includes one or more types of viewing data/content, and deleting data/content.

Further, all roles, users and employees using the mailbox account can and are only allowed to operate the content within the permission time range (or within the permission time range of the mailbox account) in the mailbox account.

The role is an independent individual not a group/a class, and during the same period, one role can only be related to a unique user, while one user is related to one or more roles. The user obtains the permissions of the related role. When or after a role is created, a department is selected for the role, and therefore the role belongs to the department. The role is authorized according to the work content of the role; the name of the role is unique under the department, and the number of the role is unique in the system.

When the user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) the permissions through a role related to his/her corresponding user.

[Embodiment 3] A method for setting an operation time range of mailbox content in a system includes the following steps. S021: selecting a role, a user or an employee as a supervisor.

The role is an independent individual not a group/a class, and during the same period, one role can only be related to a unique user, while one user is related to one or more roles. The user obtains the permissions of the related role. When or after a role is created, a department is selected for the role, and therefore the role belongs to the department. The role is authorized according to the work content of the role; the name of the role is unique under the department, and the number of the role is unique in the system.

When the user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) the permissions through a role related to his/her corresponding user.

S022: setting one or more supervisees for each supervisor, wherein the supervisee is a role, a user or an employee; and S023: setting a permission time range for each supervisor, wherein the permission time range includes one or more of the following four types: a time range from a time point, which is determined by going backwards from a current time for a fixed time length, to the current time, a time range from a start time to a current time, a time range from a deadline to a system initial time, and a time range from a start time to a deadline.

Furthermore, the permission time range further includes a time range from a system initial time to a current time.

The unit for setting the permission time range may be year, month, day, hour, minute, second, and the like.

Each supervisor operates the content within the permission time range of the supervisor in a mailbox account used by the corresponding supervisee. The operation herein specifically includes one or more types of viewing data/content, and deleting data/content.

Further, each supervisor can and is only allowed to operate the content within the permission time range of the supervisor in the mailbox account used by the corresponding supervisee.

When the supervisee is a role, the mailbox account used by the supervisee includes a mailbox account related to the role; when the supervisee is a user, the mailbox account used by the supervisee includes a mailbox related to the user, a mailbox account related to an employee corresponding to the user, and a mailbox account related to a role which is related to the user; when the supervisee is an employee, the mailbox account used by the supervisee includes a mailbox account related to the employee, a mailbox account related to a user corresponding to the employee, and a mailbox account related to a role which is related to the user corresponding to the employee.

The source of the mailbox account includes one or two of the following two types: 1. The mailbox account is a mailbox account of a mailbox application (software) in the system (that is, a mailbox account in the system), and a step of creating the mailbox account is further included in this case. 2. The mailbox account is a mailbox account of a mailbox service provided by a third party, for example, a Netease mailbox account, a QQ mailbox account, or the like. The system herein is a management system used in an enterprise, an institution or the like. The mailbox application in the system is only a part of the system, but not the absolute main part of the system.

[Embodiment 4] A method for setting an operation time range of mailbox content in a system includes the following steps. S031: selecting a role, a user or an employee as a supervisee.

The role is an independent individual not a group/a class, and during the same period, one role can only be related to a unique user, while one user is related to one or more roles.

The user obtains the permissions of the related role. When or after a role is created, a department is selected for the role, and therefore the role belongs to the department. The role is authorized according to the work content of the role; the name of the role is unique under the department, and the number of the role is unique in the system.

When the user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) the permissions through a role related to his/her corresponding user.

S032: setting a permission time range for each supervisee, wherein the permission time range includes one or more of the following four types: a time range from a time point, which is determined by going backwards from a current time for a fixed time length, to the current time, a time range from a start time to a current time, a time range from a deadline to a system initial time, and a time range from a start time to a deadline.

Furthermore, the permission time range further includes a time range from a system initial time to a current time.

The unit for setting the permission time range may be year, month, day, hour, minute, second, and the like.

All supervisors corresponding to each supervisee operate the content within the permission time range of the supervisee in a mailbox account used by the supervisee. The operation herein specifically includes one or more types of viewing data/content, and deleting data/content.

Further, all the supervisors corresponding to each supervisee can and are only allowed to operate the content within the permission time range of the supervisee in the mailbox account used by the supervisee.

When the supervisee is a role, the mailbox account used by the supervisee includes a mailbox account related to the role; when the supervisee is a user, the mailbox account used by the supervisee includes a mailbox account related to the user, a mailbox account related to an employee corresponding to the user, and a mailbox account related to a role which is related to the user; when the supervisee is an employee, the mailbox account used by the supervisee includes a mailbox account related to the employee, a mailbox account related to a user corresponding to the employee, and a mailbox account related to a role which is related to the user corresponding to the employee.

The source of the mailbox account includes one or two of the following two types: 1. The mailbox account is a mailbox account of a mailbox application (software) in the system (that is, a mailbox account in the system), and a step of creating the mailbox account is further included in this case. 2. The mailbox account is a mailbox account of a mailbox service provided by a third party, for example, a Netease mailbox account, a QQ mailbox account, or the like. The system herein is a management system used in an enterprise, an institution or the like. The mailbox application in the system is only a part of the system, but not the absolute main part of the system.

[Embodiment 5] A method for setting an operation time range of mailbox content in a system includes the following steps. S041: selecting a role, a user or an employee as a mailbox user.

The role is an independent individual not a group/a class, and during the same period, one role can only be related to a unique user, while one user is related to one or more roles. The user obtains the permissions of the related role. When or after a role is created, a department is selected for the role, and therefore the role belongs to the department. The role is authorized according to the work content of the role; the name of the role is unique under the department, and the number of the role is unique in the system.

When the user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) the permissions through a role related to his/her corresponding user.

S042: setting a permission time range for each mailbox user, wherein the permission time range includes one or more of the following four types: a time range from a time point, which is determined by going backwards from a relation time of the mailbox user and his/her currently-related mailbox account for a fixed time length, to a current time, a time range from a time point, which is determined by going forwards from a relation time of the mailbox user and his/her currently-related mailbox account for a fixed time length, to a system initial time, a time range from a relation time of the mailbox user and his/her currently-related mailbox account to a system initial time, and a time range from a relation time of the mailbox user and his/her currently-related mailbox account to a current time.

The above four types of time ranges are described in the following examples: the time range from a time point, which is determined by going backwards from a relation time of the mailbox user and his/her currently-related mailbox account for a fixed time length, to a current time. For example, a relation time of a mailbox account currently related to an employee B is May 1, 2016, and the permission time range of the employee B is set to be a time range from a time point, which is determined by going backwards from the relation time of the employee B and his/her currently-related mailbox account for two months, to the current time. In this case, the employee B can operate all content after Mar. 1, 2016 in the related mailbox account. The permission time range is set for the employee B. If the employee B is related to a new mailbox account on Oct. 1, 2016, the employee B can operate all content after Aug. 1, 2016 in the newly-related mailbox account.

The time range from a time point, which is determined by going forwards from a relation time of the mailbox user and his/her currently-related mailbox account for a fixed time length, to a system initial time. For example, a relation time of a mailbox currently related to an employee B is May 1, 2016, and the permission time range of the employee B is set to be a time range from a time point, which is determined by going forwards from the relation time of the employee B and his/her currently-related mailbox for two months, to the system initial time. In this case, the employee B can operate all content before Jul. 1, 2016 in the related mailbox.

The time range from a relation time of the mailbox user and his/her currently-related mailbox account to a system initial time. For example, a relation time of a mailbox currently related to an employee B is May 1, 2016, and the permission time range of the employee B is set to be a time range from the relation time of the employee B and his/her currently-related mailbox to the system initial time. In this case, the employee B can operate all content before May 1, 2016 in the related mailbox.

The time range from a relation time of the mailbox user and his/her currently-related mailbox account to a current time. For example, a relation time of a mailbox currently related to an employee B is May 1, 2016, and the permission time range of the employee B is set to be a time range from the relation time of the employee B and his/her currently-related mailbox to the current time. In this case, the employee B can operate all content after May 1, 2016 in the related mailbox.

The mailbox user operates the content within the permission time range of the mailbox user in the mailbox account used by the mailbox user. The operation herein specifically includes one or more types of viewing data/content, and deleting data/content.

Further, the mailbox user can and is only allowed to operate the content within the permission time range (or within the permission time range of the mailbox user) in the mailbox account used by the mailbox user.

When the mailbox user is a role, the mailbox account used by the mailbox user includes a mailbox account related to the role; when the mailbox user is a user, the mailbox account used by the mailbox user includes a mailbox account related to the user, a mailbox account related to an employee corresponding to the user, and a mailbox account related to a role which is related to the user; when the mailbox user is an employee, the mailbox account used by the mailbox user includes a mailbox account related to the employee, a mailbox account related to a user corresponding to the employee, and a mailbox account related to a role which is related to the user corresponding to the employee.

The source of the mailbox account includes one or two of the following two types: 1. The mailbox account is a mailbox account of a mailbox application (software) in the system (that is, a mailbox account in the system), and a step of creating the mailbox account is further included in this case. 2. The mailbox account is a mailbox account of a mailbox service provided by a third party, for example, a Netease mailbox account, a QQ mailbox account, or the like. The system herein is a management system used in an enterprise, an institution or the like. The mailbox application in the system is only a part of the system, but not the absolute main part of the system.

[Embodiment 6] A method for setting an operation time range of mailbox content in a system includes the following steps. S051: setting a permission time range for a mailbox account, wherein the permission time range includes one or more of the following four types: a time range from a time point, which is determined by going backwards from a relation time of the mailbox account and its currently-related mailbox user for a fixed time length, to a current time, a time range from a time point, which is determined by going forwards from a relation time of the mailbox account and its currently-related mailbox user for a fixed time length, to a system initial time, a time range from a relation time of the mailbox account and its currently-related mailbox user to a system initial time, and a time range from a relation time of the mailbox account and its currently-related mailbox user to a current time.

The source of the mailbox account includes one or two of the following two types: 1. The mailbox account is a mailbox account of a mailbox application (software) in the system (that is, a mailbox account in the system), and a step of creating the mailbox account is further included in this case. 2. The mailbox account is a mailbox account of a mailbox service provided by a third party, for example, a Netease mailbox account, a QQ mailbox account, or the like. The system herein is a management system used in an enterprise, an institution or the like. The mailbox application in the system is only a part of the system, but not the absolute main part of the system.

S052: the content within the permission time range of the mailbox account in the mailbox account being operated by all roles, users and employees using the mailbox account. The operation herein specifically includes one or more types of viewing data/content, and deleting data/content.

Further, all the roles, users and employees using the mailbox account can and are only allowed to operate the content within the permission time range (or within the permission time range of the mailbox account) in the mailbox account.

The role is an independent individual not a group/a class, and during the same period, one role can only be related to a unique user, while one user is related to one or more roles. The user obtains the permissions of the related role. When or after a role is created, a department is selected for the role, and therefore the role belongs to the department. The role is authorized according to the work content of the role; the name of the role is unique under the department, and the number of the role is unique in the system.

When the user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) the permissions through a role related to his/her corresponding user.

[Embodiment 7] A method for setting an operation time range of mailbox content in a system includes the following steps. S061: selecting a role, a user or an employee as a supervisor.

The role is an independent individual, not a group/a class, and during the same period, one role can only be related to a unique user, while one user is related to one or more roles. The user obtains the permissions of the related role. When or after a role is created, a department is selected for the role, and therefore the role belongs to the department. The role is authorized according to the work content of the role; the name of the role is unique under the department, and the number of the role is unique in the system.

When the user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) the permissions through a role related to his/her corresponding user.

S062: setting one or more supervisees for each supervisor, wherein the supervisee is a role, a user or an employee.

S063: setting a permission time range for each supervisor, wherein the permission time range includes one or more of the following four types: a time range from a time point, which is determined by going backwards from a relation time of the mailbox user and his/her currently-related mailbox account for a fixed time length, to a current time, a time range from a time point, which is determined by going forwards from a relation time of the mailbox user and his/her currently-related mailbox account for a fixed time length, to a system initial time, a time range from a relation time of the mailbox user and his/her currently-related mailbox account to a system initial time, and a time range from a relation time of the mailbox user and his/her currently-related mailbox account to a current time.

Each supervisor operates the content within the permission time range of the supervisor in a mailbox account used by the corresponding supervisee. The operation herein specifically includes one or more types of viewing data/content, and deleting data/content.

Further, each supervisor can and is only allowed to operate the content within the permission time range of the supervisor in the mailbox account used by the corresponding supervisee.

When the supervisee is a role, the mailbox account used by the supervisee includes a mailbox account related to the role; when the supervisee is a user, the mailbox account used by the supervisee includes a mailbox account related to the user, a mailbox account related to an employee corresponding to the user, and a mailbox account related to a role which is related to the user; when the supervisee is an employee, the mailbox account used by the supervisee includes a mailbox account related to the employee, a mailbox account related to a user corresponding to the employee, and a mailbox account related to a role which is related to the user corresponding to the employee.

The source of the mailbox account includes one or two of the following two types: 1. The mailbox account is a mailbox account of a mailbox application (software) in the system (that is, a mailbox account in the system), and a step of creating the mailbox account is further included in this case. 2. The mailbox account is a mailbox account of a mailbox service provided by a third party, for example, a Netease mailbox account, a QQ mailbox account, or the like. The system herein is a management system used in an enterprise, an institution or the like. The mailbox application in the system is only a part of the system, but not the absolute main part of the system.

[Embodiment 8] A method for setting an operation time range of mailbox content in a system includes the following steps. S071: selecting a role, a user or an employee as a supervisee.

The role is an independent individual not a group/a class, and during the same period, one role can only be related to a unique user, while one user is related to one or more roles. The user obtains the permissions of the related role. When or after a role is created, a department is selected for the role, and therefore the role belongs to the department. The role is authorized according to the work content of the role; the name of the role is unique under the department, and the number of the role is unique in the system.

When the user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) the permissions through a role related to his/her corresponding user.

S072: setting a permission time range for each supervisee, wherein the permission time range includes one or more of the following four types: a time range from a time point, which is determined by going backwards from a relation time of the mailbox user and his/her currently-related mailbox account for a fixed time length, to a current time, a time range from a time point, which is determined by going forwards from a relation time of the mailbox user and his/her currently-related mailbox account for a fixed time length, to a system initial time, a time range from a relation time of the mailbox user and his/her currently-related mailbox account to a system initial time, and a time range from a relation time of the mailbox user and his/her currently-related mailbox account to a current time.

All supervisors corresponding to each supervisee operate the content within the permission time range of the supervisee in a mailbox account used by the supervisee. The operation herein specifically includes one or more types of viewing data/content, and deleting data/content.

Further, all the supervisors corresponding to each supervisee can and are only allowed to operate the content within the permission time range of the supervisee in the mailbox account used by the supervisee.

When the supervisee is a role, the mailbox account used by the supervisee includes a mailbox account related to the role; when the supervisee is a user, the mailbox account used by the supervisee includes a mailbox account related to the user, a mailbox account related to an employee corresponding to the user, and a mailbox account related to a role which is related to the user; when the supervisee is an employee, the mailbox account used by the supervisee includes a mailbox account related to the employee, a mailbox account related to a user corresponding to the employee, and a mailbox account related to a role which is related to the user corresponding to the employee.

The source of the mailbox account includes one or two of the following two types: 1. The mailbox account is a mailbox account of a mailbox application (software) in the system (that is, a mailbox account in the system), and a step of creating the mailbox account is further included in this case. 2. The mailbox account is a mailbox account of a mailbox service provided by a third party, for example, a Netease mailbox account, a QQ mailbox account, or the like. The system herein is a management system used in an enterprise, an institution or the like. The mailbox application in the system is only a part of the system, but not the absolute main part of the system.

[Embodiment 9] As shown in FIG. 3, a method for setting an operation time range of instant messaging content in a system includes the following steps. S081: selecting a role, a user or an employee as an instant messaging user.

After the relation between a role and an instant messaging account is created, during the same period, one role can only be related to one instant messaging account, and one instant messaging account can only be related to one role. After the relation between a user and an instant messaging account is created, during the same period, one user can only be related to one instant messaging account, and one instant messaging account can only be related to one user. After the relation between an employee and an instant messaging account is created, during the same period, one employee can only be related to one instant messaging account, and one instant messaging account can only be related to one employee.

The role is an independent individual not a group/a class, and during the same period, one role can only be related to a unique user, while one user is related to one or more roles. The user obtains the permissions of the related role. When or after a role is created, a department is selected for the role, and therefore the role belongs to the department. The role is authorized according to the work content of the role; the name of the role is unique under the department, and the number of the role is unique in the system.

When a user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) the permissions through a role related to his/her corresponding user.

S082: setting a permission time range for each instant messaging user, wherein the permission time range includes one or more of the following four types: a time range from a time point, which is determined by going backwards from a current time for a fixed time length, to the current time, a time range from a start time to a current time, a time range from a deadline to a system initial time, and a time range from a start time to a deadline Furthermore, the permission time range further includes a time range from a system initial time to a current time.

The unit for setting the permission time range may be year, month, day, hour, minute, second, and the like.

The above five types of time ranges are described in the following examples: a time range from a time point, which is determined by going backwards from a current time for a fixed time length, to the current time. For example, on Jun. 20, 2017, an employee A is authorized to view instant messaging data/content within a time range from a time point, which is determined by going backwards 6 days from Jun. 20, 2017, to Jun. 20, 2017 (which is the current time, what is authorized is "till the current time" not a specific time point) in an instant messaging account used by the employee A. That is, on Jun. 20, 2017, the employee A can view instant messaging data/content from Jun. 15, 2017 to Jun. 20, 2017 in the instant messaging account used by the employee A; on Jun. 21, 2017, the employee A can view instant messaging data/content from Jun. 16, 2017 to Jun. 21, 2017 in the instant messaging account used by the employee A; on Jun. 22, 2017, the employee A can view instant messaging data/content from Jun. 17, 2017 to Jun. 22, 2017 in the instant messaging account used by the employee A, and so on. That is, the time length of the time range is fixed, and the start time and the deadline are both variable automatically.

The time range from a start time to a current time (the current time is dynamic). For example, on May 1, 2015, the employee A is authorized to view instant messaging data/content from Feb. 1, 2015 to the current date (current time) in the instant messaging account used by the employee A. Then, the employee A can view instant messaging data/content from Feb. 1, 2015 to May 1, 2015 in the instant messaging account used by the employee A; on May 2, 2015, the employee A can view instant messaging data/content from Feb. 1, 2015 to May 2, 2015 in the instant messaging account used by the employee A (further, the start time can be defined as the start time that is excluded, and when the start time is excluded, the employee A cannot view instant messaging data/content on Feb. 1, 2015 in the instant messaging account used by the employee A, and can only view instant messaging data/content after Feb. 1, 2015 in the instant messaging account used by the employee A; further, other time ranges in the present application, if related to the definition of the start time, may also exclude the start time).

The time range from a deadline to a system initial time. For example, the employee A is authorized to view instant messaging data/content from Feb. 1, 2015 to the system initial time in the instant messaging account used by the employee A. Then, the employee A can view instant messaging data/content from Feb. 1, 2015 to the system initial time in the instant messaging account used by the employee A (that is, the employee A can view instant messaging data/content on and before Feb. 1, 2015 in the instant messaging account used by the employee A in the system); (further, the deadline can be defined as the deadline that is excluded, and when the deadline is excluded, the employee A cannot view instant messaging data/content on Feb. 1, 2015 in the instant messaging account used by the employee A, but can only view instant messaging data/content before Feb. 1, 2015 in the instant messaging account used by the employee A; furthermore, the system initial time may not be set and only the deadline is set, and in this case, the employee A can view instant messaging data/content on and before the deadline in the instant messaging account used by the employee A, or the employee A can view instant messaging data/content before the deadline in the instant messaging account used by the employee A).

The time range from a start time to a deadline. For example, the employee A is authorized to view instant messaging data/content from Feb. 1, 2015 to Jun. 1, 2015 in the instant messaging account used by the employee A. Then, the employee A can view instant messaging data/content from Feb. 1, 2015 to Jun. 1, 2015 in the instant messaging account used by the employee A.

The time range from a system initial time to a current time (the current time is dynamic). For example, on Jun. 1, 2017, the employee A is authorized to view instant messaging data/content from the system initial time to the current time in the instant messaging account used by the employee A. Then, on Jun. 1, 2017, the employee A can view instant messaging data/content from the system initial time to Jun. 1, 2017 in the instant messaging account used by the employee A; on Jun. 2, 2017, the employee A can view all instant messaging data/content from the system initial time to Jun. 2, 2017 in the instant messaging account used by the employee A, and so on. Further, the system initial time may not be set, and in this case, the time range from the system initial time to the current time is a time range including all time. Further, if other time ranges in the present application relate to the definition of the system initial time, the system initial time may not be set either.

Both the deadline and the start time are set manually.

In the above description, the permission time range is set for the employee A rather than the instant messaging account. After the permission time range is set for the employee A, the employee A can only operate the content within the permission time range set for the employee A in the instant messaging account used by himself/herself. The employee A uses an instant messaging account A now, and later the employee A uses an instant messaging account B instead of the instant messaging account A. In this case, the employee A can only operate the content within the permission time range set for the employee A in the instant messaging account B.

The instant messaging user operates the content within the permission time range of the instant messaging user in an instant messaging account used by the instant messaging user. The operation herein specifically includes one or more types of viewing data/content, and deleting data/content.

Further, the instant messaging user can and is only allowed to operate the content within the permission time range (or the permission time range of the instant messaging user) in the instant messaging account used by the instant messaging user.

When the instant messaging user is a role, the instant messaging account used by the instant messaging user includes an instant messaging account related to the role; when the instant messaging user is a user, the instant messaging account used by the instant messaging user includes an instant messaging account related to the user, an instant messaging account related to an employee corresponding to the user, and an instant messaging account related to a role which is related to the user; when the instant messaging user is an employee, the instant messaging account used by the instant messaging user includes an instant messaging account related to the employee, an instant messaging account related to a user corresponding to the employee, and an instant messaging account related to a role which is related to the user corresponding to the employee.

The source of the instant messaging account includes one or two of the following two types: 1. The instant messaging account is an instant messaging account of an instant messaging application (software) in the system (that is, an instant messaging account in the system), and a step of creating the instant messaging account is further included in this case. 2. The instant messaging account is an instant messaging account of instant messaging software provided by a third party. The system herein is a management system used in an enterprise, an institution or the like. The instant messaging application in the system is only a part of the system, but not the absolute main part of the system.

[Embodiment 10] A method for setting an operation time range of instant messaging content in a system includes the following steps. S091: setting a permission time range for an instant messaging account (rather than setting a time range for an instant messaging user), wherein the permission time range includes one or more of the following four types: a time range from a time point, which is determined by going backwards from a current time for a fixed time length, to the current time, a time range from a start time to a current time, a time range from a deadline to a system initial time, and a time range from a start time to a deadline.

The source of the instant messaging account includes one or two of the following two types: 1. The instant messaging account is an instant messaging account of an instant messaging application (software) in the system (that is, an instant messaging account in the system), and a step of creating the instant messaging account is further included in this case. 2. The instant messaging account is an instant messaging account of instant messaging software provided by a third party. The system herein is a management system used in an enterprise, an institution or the like. The instant messaging application in the system is only a part of the system, but not the absolute main part of the system.

S092: the content within the permission time range of the instant messaging account in the instant messaging account being operated by all roles, users and employees using the instant messaging account. The operation herein specifically includes one or more types of viewing data/content, and deleting data/content.

Further, the roles, users and employees corresponding to the instant messaging account can and are only allowed to operate the content within the permission time range (or the permission time range of the instant messaging account) in the instant messaging account.

The role is an independent individual not a group/a class, and during the same period, one role can only be related to a unique user, while one user is related to one or more roles. The user obtains the permissions of the related role. When or after a role is created, a department is selected for the role, and therefore the role belongs to the department. The role is authorized according to the work content of the role; the name of the role is unique under the department, and the number of the role is unique in the system.

When the user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) the permissions through a role related to his/her corresponding user.

[Embodiment 11] A method for setting an operation time range of instant messaging content in a system includes the following steps. S101: selecting a role, a user or an employee as a supervisor.

The role is an independent individual not a group/a class, and during the same period, one role can only be related to a unique user, while one user is related to one or more roles. The user obtains the permissions of the related role. When or after a role is created, a department is selected for the role, and therefore the role belongs to the department. The role is authorized according to the work content of the role; the name of the role is unique under the department, and the number of the role is unique in the system.

When the user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) the permissions through a role related to his/her corresponding user.

S102: setting one or more supervisees for each supervisor, wherein the supervisee is a role, a user or an employee;

S103: setting a permission time range for each supervisor, wherein the permission time range includes one or more of the following four types: a time range from a time point, which is determined by going backwards from a current time for a fixed time length, to the current time, a time range from a start time to a current time, a time range from a deadline to a system initial time, and a time range from a start time to a deadline;

Each supervisor operates the content within the permission time range of the supervisor in an instant messaging account used by the corresponding supervisee. The operation herein specifically includes one or more types of viewing data/content, and deleting data/content.

Further, each supervisor can and is only allowed to operate the content within the permission time range of the supervisor in the instant messaging account used by the corresponding supervisee.

When the supervisee is a role, the instant messaging account used by the supervisee includes an instant messaging account related to the role; when the supervisee is a user, the instant messaging account used by the supervisee includes an instant messaging account related to the user, an instant messaging account related to an employee corresponding to the user, and an instant messaging account related to a role which is related to the user; when the supervisee is an employee, the instant messaging account used by the supervisee includes an instant messaging account related to the employee, an instant messaging account related to a user corresponding to the employee, and an instant messaging account related to a role which is related to the user corresponding to the employee.

The source of the instant messaging account includes one or two of the following two types: 1. The instant messaging account is an instant messaging account of an instant messaging application (software) in the system (that is, an instant messaging account in the system), and a step of creating the instant messaging account is further included in this case. 2. The instant messaging account is an instant messaging account of instant messaging software provided by a third party. The system herein is a management system used in an enterprise, an institution or the like. The instant messaging application in the system is only a part of the system, but not the absolute main part of the system.

[Embodiment 12] A method for setting an operation time range of instant messaging content in a system includes the following steps. S111: selecting a role, a user or an employee as a supervisee.

The role is an independent individual not a group/a class, and during the same period, one role can only be related to a unique user, while one user is related to one or more roles. The user obtains the permissions of the related role. When or after a role is created, a department is selected for the role, and therefore the role belongs to the department. The role is authorized according to the work content of the role; the name of the role is unique under the department, and the number of the role is unique in the system.

When the user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) the permissions through a role related to his/her corresponding user.

S112: setting a permission time range for each supervisee, wherein the permission time range includes one or more of the following four types: a time range from a time point, which is determined by going backwards from a current time for a fixed time length, to the current time, a time range from a start time to a current time, a time range from a deadline to a system initial time, and a time range from a start time to a deadline.

All supervisors corresponding to each supervisee operate the content within the permission time range of the supervisee in an instant messaging account used by the supervisee. The operation herein specifically includes one or more types of viewing data/content, and deleting data/content.

Further, all the supervisors corresponding to each supervisee can and are only allowed to operate the content within the permission time range of the supervisee in the instant messaging account used by the supervisee.

When the supervisee is a role, the instant messaging account used by the supervisee includes an instant messaging account related to the role; when the supervisee is a user, the instant messaging account used by the supervisee includes an instant messaging account related to the user, an instant messaging account related to an employee corresponding to the user, and an instant messaging account related to a role which is related to the user; when the supervisee is an employee, the instant messaging account used by the supervisee includes an instant messaging account related to the employee, an instant messaging account related to a user corresponding to the employee, and an instant messaging account related to a role which is related to the user corresponding to the employee.

The source of the instant messaging account includes one or two of the following two types: 1. The instant messaging account is an instant messaging account of an instant messaging application (software) in the system (that is, an instant messaging account in the system), and a step of creating the instant messaging account is further included in this case. 2. The instant messaging account is an instant messaging account of instant messaging software provided by a third party. The system herein is a management system used in an enterprise, an institution or the like. The instant messaging application in the system is only a part of the system, but not the absolute main part of the system.

[Embodiment 13] A method for setting an operation time range of instant messaging content in a system includes the following steps. S121: selecting a role, a user or an employee as an instant messaging user.

The role is an independent individual not a group/a class, and during the same period, one role can only be related to a unique user, while one user is related to one or more roles. The user obtains the permissions of the related role. When or after a role is created, a department is selected for the role, and therefore the role belongs to the department. The role is authorized according to the work content of the role; the name of the role is unique under the department, and the number of the role is unique in the system.

When the user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) the permissions through a role related to his/her corresponding user.

S112: setting a permission time range for each instant messaging user, wherein the permission time range includes one or more of the following four types: a time range from a time point, which is determined by going backwards from a relation time of the instant messaging user and his/her currently-related instant messaging account for a fixed time length, to a current time, a time range from a time point, which is determined by going forwards from a relation time of the instant messaging user and his/her currently-related instant messaging account for a fixed time length, to a system initial time, a time range from a relation time of the instant messaging user and his/her currently-related instant messaging account to a system initial time, and a time range from a relation time of the instant messaging user and his/her currently-related instant messaging account to a current time.

The above four types of time ranges are described in the following examples: the time range from a time point, which is determined by going backwards from a relation time of the instant messaging user and his/her currently-related instant messaging account for a fixed time length, to a current time. For example, a relation time of an instant messaging account currently related to an employee B is May 1, 2016, and the permission time range of the employee B is set to be a time range from a time point, which is determined by going backwards from the relation time of the employee B and his/her currently-related instant messaging account for two months, to the current time. In this case, the employee B can operate all content after Mar. 1, 2016 in the related instant messaging account. The permission time range is set for the employee B. If the employee B is related to a new instant messaging account on Oct. 1, 2016, the employee B can operate all content after Aug. 1, 2016 in the newly-related instant messaging account.

The time range from a time point, which is determined by going forwards from a relation time of the instant messaging user and his/her currently-related instant messaging account for a fixed time length, to a system initial time. For example, a relation time of an instant messaging account currently related to an employee B is May 1, 2016, and the permission time range of the employee B is set to be a time range from a time point, which is determined by going forwards from the relation time of the employee B and his/her currently-related instant messaging account for two months, to the system initial time. In this case, the employee B can operate all content before Jul. 1, 2016 in the related instant messaging account.

The time range from a relation time of the instant messaging user and his/her currently-related instant messaging account to a system initial time. For example, a relation time of an instant messaging account currently related to an employee B is May 1, 2016, and the permission time range of the employee B is set to be a time range from the relation time of the employee B and his/her currently-related instant messaging account to the system initial time. In this case, the employee B can operate all content before May 1, 2016 in the related instant messaging account.

The time range from a relation time of the instant messaging user and his/her currently-related instant messaging account to a current time. For example, a relation time of an instant messaging account currently related to an employee B is May 1, 2016, and the permission time range of the employee B is set to be a time range from the relation time of the employee B and his/her currently-related instant messaging account to the current time. In this case, the employee B can operate all content after May 1, 2016 in the related instant messaging account.

The instant messaging user operates the content within the permission time range of the instant messaging user in the instant messaging account used by the instant messaging user. The operation herein specifically includes one or more types of viewing data/content, and deleting data/content.

Further, the instant messaging user can and is only allowed to operate the content within the permission time range (or within the permission time range of the instant messaging user) in the instant messaging account used by the instant messaging user.

When the instant messaging user is a role, the instant messaging account used by the instant messaging user includes an instant messaging account related to the role; when the instant messaging user is a user, the instant messaging account used by the instant messaging user includes an instant messaging account related to the user, an instant messaging account related to an employee corresponding to the user, and an instant messaging account related to a role which is related to the user; when the instant messaging user is an employee, the instant messaging account used by the instant messaging user includes an instant messaging account related to the employee, an instant messaging account related to a user corresponding to the employee, and an instant messaging account related to a role which is related to the user corresponding to the employee.

The source of the instant messaging account includes one or two of the following two types: 1. The instant messaging account is an instant messaging account of an instant messaging application (software) in the system (that is, an instant messaging account in the system), and a step of creating the instant messaging account is further included in this case. 2. The instant messaging account is an instant messaging account of instant messaging software provided by a third party. The system herein is a management system used in an enterprise, an institution or the like. The instant messaging application in the system is only a part of the system, but not the absolute main part of the system.

[Embodiment 14] A method for setting an operation time range of instant messaging content in a system includes the following steps. S131: setting a permission time range for an instant messaging account, wherein the permission time range includes one or more of the following four types: a time range from a time point, which is determined by going backwards from a relation time of the instant messaging account and its currently-related instant messaging user for a fixed time length, to a current time, a time range from a time point, which is determined by going forwards from a relation time of the instant messaging account and its currently-related instant messaging user for a fixed time length, to a system initial time, a time range from a relation time of the instant messaging account and its currently-related instant messaging user to a system initial time, and a time range from a relation time of the instant messaging account and its currently-related instant messaging user to a current time.

The source of the instant messaging account includes one or two of the following two types: 1. The instant messaging account is an instant messaging account of an instant messaging application (software) in the system (that is, an instant messaging account in the system), and a step of creating the instant messaging account is further included in this case. 2. The instant messaging account is an instant messaging account of instant messaging software provided by a third party. The system herein is a management system used in an enterprise, an institution or the like. The instant messaging application in the system is only a part of the system, but not the absolute main part of the system.

S132: the content within the permission time range of the instant messaging account in the instant messaging account being operated by all roles, users, and employees using the instant messaging account. The operation herein specifically includes one or more types of viewing data/content, and deleting data/content.

Further, the roles, users and employees corresponding to the instant messaging account can and are only allowed to operate the content within the permission time range (or the permission time range of the instant messaging account) in the instant messaging account.

The role is an independent individual not a group/a class, and during the same period, one role can only be related to a unique user, while one user is related to one or more roles. The user obtains the permissions of the related role. When or after a role is created, a department is selected for the role, and therefore the role belongs to the department. The role is authorized according to the work content of the role; the name of the role is unique under the department, and the number of the role is unique in the system.

When the user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) the permissions through a role related to his/her corresponding user.

[Embodiment 15] A method for setting an operation time range of instant messaging content in a system includes the following steps. S141: selecting a role, a user or an employee as a supervisor.

The role is an independent individual not a group/a class, and during the same period, one role can only be related to a unique user, while one user is related to one or more roles. The user obtains the permissions of the related role. When or after a role is created, a department is selected for the role, and therefore the role belongs to the department. The role is authorized according to the work content of the role; the name of the role is unique under the department, and the number of the role is unique in the system.

When the user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) the permissions through a role related to his/her corresponding user.

S142: setting one or more supervisees for each supervisor, wherein the supervisee is a role, a user or an employee.

S143: setting a permission time range for each supervisor, wherein the permission time range includes one or more of the following four types: a time range from a time point, which is determined by going backwards from a relation time of the instant messaging user and his/her currently-related instant messaging account for a fixed time length, to a current time, a time range from a time point, which is determined by going forwards from a relation time of the instant messaging user and his/her currently-related instant messaging account for a fixed time length, to a system initial time, a time range from a relation time of the instant messaging user and his/her currently-related instant messaging account to a system initial time, and a time range from a relation time of the instant messaging user and his/her currently-related instant messaging account to a current time.

Each supervisor operates the content within the permission time range of the supervisor in an instant messaging account used by the corresponding supervisee. The operation herein specifically includes one or more types of viewing data/content, and deleting data/content.

Further, each supervisor can and is only allowed to operate the content within the permission time range of the supervisor in the instant messaging account used by the corresponding supervisee.

When the supervisee is a role, the instant messaging account used by the supervisee includes an instant messaging account related to the role; when the supervisee is a user, the instant messaging account used by the supervisee includes an instant messaging account related to the user, an instant messaging account related to an employee corresponding to the user, and an instant messaging account related to a role which is related to the user; when the supervisee is an employee, the instant messaging account used by the supervisee includes an instant messaging account related to the employee, an instant messaging account related to a user corresponding to the employee, and an instant messaging account related to a role which is related to the user corresponding to the employee.

The source of the instant messaging account includes one or two of the following two types: 1. The instant messaging account is an instant messaging account of an instant messaging application (software) in the system (that is, an instant messaging account in the system), and a step of creating the instant messaging account is further included in this case. 2. The instant messaging account is an instant messaging account of instant messaging software provided by a third party. The system herein is a management system used in an enterprise, an institution or the like. The instant messaging application in the system is only a part of the system, but not the absolute main part of the system.

[Embodiment 16] A method for setting an operation time range of instant messaging content in a system includes the following steps. S151: selecting a role, a user or an employee as a supervisee.

The role is an independent individual not a group/a class, and during the same period, one role can only be related to a unique user, while one user is related to one or more roles. The user obtains the permissions of the related role. When or after a role is created, a department is selected for the role, and therefore the role belongs to the department. The role is authorized according to the work content of the role; the name of the role is unique under the department, and the number of the role is unique in the system.

When the user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) the permissions through a role related to his/her corresponding user.

S152: setting a permission time range for each supervisee, wherein said permission time range comprises one or more of the following four types: a time range from a time point, which is determined by going backwards from a relation time of the instant messaging user and his/her currently-related instant messaging account for a fixed time length, to a current time, a time range from a time point, which is determined by going forwards from a relation time of the instant messaging user and his/her currently-related instant messaging account for a fixed time length, to a system initial time, a time range from a relation time of the instant messaging user and his/her currently-related instant messaging account to a system initial time, and a time range from a relation time of the instant messaging user and his/her currently-related instant messaging account to a current time.

All supervisors corresponding to each supervisee operate the content within the permission time range of the supervisee in an instant messaging account used by the supervisee. The operation herein specifically includes one or more types of viewing data/content, and deleting data/content.

Further, all the supervisors corresponding to each supervisee can and are only allowed to operate the content within the permission time range of the supervisee in the instant messaging account used by the supervisee.

When the supervisee is a role, the instant messaging account used by the supervisee includes an instant messaging account related to the role; when the supervisee is a user, the instant messaging account used by the supervisee includes an instant messaging account related to the user, an instant messaging account related to an employee corresponding to the user, and an instant messaging account related to a role which is related to the user; when the supervisee is an employee, the instant messaging account used by the supervisee includes an instant messaging account related to the employee, an instant messaging account related to a user corresponding to the employee, and an instant messaging account related to a role which is related to the user corresponding to the employee.

The source of the instant messaging account includes one or two of the following two types: 1. The instant messaging account is an instant messaging account of an instant messaging application (software) in the system (that is, an instant messaging account in the system), and a step of creating the instant messaging account is further included in this case. 2. The instant messaging account is an instant messaging account of instant messaging software provided by a third party. The system herein is a management system used in an enterprise, an institution or the like. The instant messaging application in the system is only a part of the system, but not the absolute main part of the system.

The above is only a preferred embodiment of the present invention, and it should be understood that the present invention is not limited to the forms disclosed herein, and is not to be construed as being limited to the other embodiments, but may be used in various other combinations, modifications and environments. Modification can be made by the techniques or knowledge of the above teachings or related art within the scope of the teachings herein. All changes and modifications made by those skilled in the art without departing from the spirit and scope of the present invention are intended to be within the protection scope of the appended claims.

What is claimed is:

1. A method for setting a permission time range of mailbox content in a system, comprising:
   selecting a user for a mailbox account;
   setting a permission time range for the user, wherein said permission time range comprises one or more of the following: a time range from a time point, which is determined by going backwards from a current time for a fixed time length, to the current time, a time range from a start time to a current time, a time range from a deadline to a system initial time, and a time range from a start time to a deadline;
   wherein content within the permission time range in the mailbox account is configured to be accessible to said selected user;
   wherein said mailbox account is configured to be related to a role only and said role is configured to be related to said mailbox account only in a same period, wherein the role is independent being configured to be related to a user only during the same period, and the user is configured to be related to the role or more roles, wherein the user is configured to obtain one or more permissions of the related one role or more roles.

2. A method for setting a permission time range of mailbox content in a system, comprising:
   setting a permission time range for a mailbox account, wherein said permission time range comprises one or more of the following: a time range from a time point, which is determined by going backwards from a current time for a fixed time length, to the current time, a time range from a start time to a current time, a time range from a deadline to a system initial time, and a time range from a start time to a deadline; and
   the content within the permission time range of the mailbox account is configured to be accessible to a user and/or a role related to the mailbox account;
   wherein said mailbox account is configured to be related to a role only and said role is configured to be related to said mailbox account only in a same period, wherein the role is independent being configured to be related to a user only during the same period, the user is configured to be related to the role or more roles, wherein the user is configured to obtain one or more permissions of the related one role or more roles.

3. A method for setting a permission time range of mailbox content in a system, comprising:
   selecting a supervisor;
   selecting one or more supervisees for the supervisor;
   setting a permission time range for the supervisor, wherein said permission time range comprises one or more of the following: a time range from a time point, which is determined by going backwards from a current time for a fixed time length, to the current time, a time range from a start time to a current time, a time range from a deadline to a system initial time, and a time range from a start time to a deadline; and
   the content within the permission time range in a mailbox account or mailbox accounts used by the selected one or more supervisees is configured to be accessible to the selected supervisor;
   wherein the supervisor and each of the one or more supervisees is a user or a role, said mailbox account is configured to be related to a role only and said role is configured to be related to said mailbox account only in a same period, wherein the role is independent being configured to be related to a user only during the same period, and the user is configured to be related to the role or more roles, wherein the user is configured to obtain one or more permissions of the related one role or more roles.

4. A method for setting a permission time range of mailbox content in a system, comprising:
   selecting a supervisee;
   setting a permission time range for the supervisee, wherein said permission time range comprises one or more of the following: a time range from a time point, which is determined by going backwards from a current time for a fixed time length, to the current time, a time range from a start time to a current time, a time range from a deadline to a system initial time, and a time range from a start time to a deadline; and
   wherein content within the permission time range in a mailbox account of the selected supervisee is configured to be accessible to a supervisor corresponding to the selected supervisee;
   wherein the supervisor and the supervisee is a user or a role, said mailbox account is configured to be related to a role only and said role is configured to be related to said mailbox account only in a same period, wherein the role is independent being configured to be related to a user only during the same period, and the user is configured to be related to the role or more roles, wherein the user is configured to obtain one or more permissions of the related one role or more roles.

5. A method for setting a permission time range of mailbox content in a system, comprising:
   selecting a user for a mailbox account;
   setting a permission time range for the user, wherein said permission time range comprises one or more of the following: a time range from a time point, which is determined by going backwards from a relation time of the mailbox user and his/her currently-related mailbox account for a fixed time length, to a current time, a time range from a time point, which is determined by going forwards from a relation time of the mailbox user and his/her currently-related mailbox account for a fixed time length, to a system initial time, a time range from a relation time of the mailbox user and his/her currently-related mailbox account to a system initial time, and a time range from a relation time of the mailbox user and his/her currently-related mailbox account to a current time; and
   wherein content within the permission time range in the mailbox account is configured to be accessible to said selected user;
   wherein said mailbox account is configured to be related to a role only and said role is configured to be related to said mailbox account only in a same period, wherein the role is independent being configured to be related to a user only during the same period, and the user is configured to be related to the role or more roles, wherein the user is configured to obtain one or more permissions of the related one role or more roles.

6. A method for setting a permission time range of mailbox content in a system, comprising:

setting a permission time range for a mailbox account, wherein said permission time range comprises one or more of the following: a time range from a time point, which is determined by going backwards from a relation time of the mailbox account and its currently-related mailbox user for a fixed time length, to a current time, a time range from a time point, which is determined by going forwards from a relation time of the mailbox account and its currently-related mailbox user for a fixed time length, to a system initial time, a time range from a relation time of the mailbox account and its currently-related mailbox user to a system initial time, and a time range from a relation time of the mailbox account and its currently-related mailbox user to a current time; and wherein content within the permission time range in the mailbox account is configured to be accessible to a user and/or a role related to the mailbox account;

wherein said mailbox account is configured to be related to a role only and said role is configured to be related to said mailbox account only in a same period, wherein the role is independent being configured to be related to a user only during the same period, and the user is configured to be related to the role or more roles, wherein the user is configured to obtain one or more permissions of the related one role or more roles.

7. A method for setting a permission time range of mailbox content in a system, comprising:

selecting a supervisor;

setting one or more supervisees for the supervisor;

setting a permission time range for the supervisor, wherein said permission time range comprises one or more of the following: a time range from a time point, which is determined by going backwards from a relation time of the mailbox user and his/her currently-related mailbox account for a fixed time length, to a current time, a time range from a time point, which is determined by going forwards from a relation time of the mailbox user and his/her currently-related mailbox account for a fixed time length, to a system initial time, a time range from a relation time of the mailbox user and his/her currently-related mailbox account to a system initial time, and a time range from a relation time of the mailbox user and his/her currently-related mailbox account to a current time; and wherein content within the permission time range in a mailbox account or mailbox accounts used by the one or more supervisees is configured to be accessible to the selected supervisor;

wherein the supervisor and each of the one or more supervisees is a user or a role, said mailbox account is configured to be related to a role only and said role is configured to be related to said mailbox account only in a same period, wherein the role is independent being configured to be related to a user only during the same period, and the user is configured to be related to the role or more roles, wherein the user is configured to obtain one or more permissions of the related one role or more roles.

8. A method for setting a permission time range of mailbox content in a system, comprising:

selecting a supervisee;

setting a permission time range for the supervisee, wherein said permission time range comprises one or more of the following: a time range from a time point, which is determined by going backwards from a relation time of the mailbox user and his/her currently-related mailbox account for a fixed time length, to a current time, a time range from a time point, which is determined by going forwards from a relation time of the mailbox user and his/her currently-related mailbox account for a fixed time length, to a system initial time, a time range from a relation time of the mailbox user and his/her currently-related mailbox account to a system initial time, and a time range from a relation time of the mailbox user and his/her currently-related mailbox account to a current time; and wherein content within the permission time range in a mailbox account of the supervisee is configured to be accessible to a supervisor corresponding to the selected supervisee;

wherein the supervisor and the supervisee is a user or a role, said mailbox account is configured to be related to a role only and said role is configured to be related to said mailbox account only in a same period, wherein the role is independent being configured to be related to a user only during the same period, and the user is configured to be related to the role or more roles, wherein the user is configured to obtain one or more permissions of the related one role or more roles.

9. A method for setting a permission time range of instant messaging content in a system, comprising:

selecting a user for an instant messaging account;

setting a permission time range for the user, wherein said permission time range comprises one or more of the following: a time range from a time point, which is determined by going backwards from a current time for a fixed time length, to the current time, a time range from a start time to a current time, a time range from a deadline to a system initial time, and a time range from a start time to a deadline; and wherein content within the permission time range in the instant messaging account is being configured to be accessible to said selected user;

wherein said instant messaging account is configured to be related to a role only and said role is configured to be related to said instant messaging account only in a same period, wherein the role is independent which is not a group or a class, the role is configured to be related to a user only during the same period, and the user is configured to be related to the role or more roles, and the user is configured to obtain one or more permissions of the related one role or more roles.

10. A method for setting a permission time range of instant messaging content in a system, comprising:

setting a permission time range for an instant messaging account, wherein said permission time range comprises one or more of the following: a time range from a time point, which is determined by going backwards from a current time for a fixed time length, to the current time, a time range from a start time to a current time, a time range from a deadline to a system initial time, and a time range from a start time to a deadline; and wherein content within the permission time range in the instant messaging account is being configured to be accessible to a role and/or a user related to the instant messaging account' wherein said instant messaging account is configured to be related to a role only and said role is configured to be related to said instant messaging account only in a same period, wherein the role is independent being configured to be related to a user only during the same period, the user is configured to be related to the role or more roles, wherein the user is configured to obtain one or more permissions of the related one role or more roles.

11. A method for setting a permission time range of instant messaging content in a system, comprising:

selecting a supervisor;

setting one or more supervisees for the supervisor;

setting a permission time range for the supervisor, wherein said permission time range comprises one or more of the following: a time range from a time point, which is determined by going backwards from a current time for a fixed time length, to the current time, a time range from a start time to a current time, a time range from a deadline to a system initial time, and a time range from a start time to a deadline; and wherein content within the permission time range in an instant messaging account or instant messaging accounts used by the one or more supervisees is being configured to be accessible to the selected supervisor;

wherein the supervisor and each of the one or more supervisees is a user or a role, said instant messaging account is configured to be related to a role only and said role is configured to be related to said instant messaging account only in a same period, wherein the role is independent being configured to be related to a user only during the same period, and the user is configured to be related to the role or more roles, wherein the user is configured to obtain one or more permissions of the related one role or more roles.

12. A method for setting a permission time range of instant messaging content in a system, comprising:

selecting a supervisee;

setting a permission time range for the supervisee, wherein said permission time range comprises one or more of the following: a time range from a time point, which is determined by going backwards from a current time for a fixed time length, to the current time, a time range from a start time to a current time, a time range from a deadline to a system initial time, and a time range from a start time to a deadline; and wherein content within the permission time range in an instant messaging account used by the supervisee is being configured to be accessible to a supervisor corresponding to the selected supervisee;

wherein the supervisor and the supervisee is a user or a role, said instant messaging account is configured to be related to a role only and said role is configured to be related to said instant messaging account only in a same period, wherein the role is independent being configured to be related to a user only during the same period, and the user is configured to be related to the role or more roles, wherein the user is configured to obtain one or more permissions of the related one role or more roles.

13. A method for setting a permission time range of instant messaging content in a system, comprising:

selecting user for an instant messaging account;

setting a permission time range for the user, wherein said permission time range comprises one or more of the following: a time range from a time point, which is determined by going backwards from a relation time of the instant messaging user and his/her currently-related instant messaging account for a fixed time length, to a current time, a time range from a time point, which is determined by going forwards from a relation time of the instant messaging user and his/her currently-related instant messaging account for a fixed time length, to a system initial time, a time range from a relation time of the instant messaging user and his/her currently-related instant messaging account to a system initial time, and a time range from a relation time of the instant messaging user and his/her currently-related instant messaging account to a current time; and wherein content within the permission time range in the instant messaging account is being configured to be accessible to said selected user;

wherein said instant messaging account is configured to be related to a role only and said role is configured to be related to said instant messaging account only in a same period, wherein the role is independent being configured to be related to a user only during the same period, the user is configured to be related to the role or more roles, wherein the user is configured to obtain one or more permissions of the related one role or more roles.

14. A method for setting a permission time range of instant messaging content in a system, comprising:

setting a permission time range for an instant messaging account, wherein said permission time range comprises one or more of the following: a time range from a time point, which is determined by going backwards from a relation time of the instant messaging account and its currently-related instant messaging user for a fixed time length, to a current time, a time range from a time point, which is determined by going forwards from a relation time of the instant messaging account and its currently-related instant messaging user for a fixed time length, to a system initial time, a time range from a relation time of the instant messaging account and its currently-related instant messaging user to a system initial time, and a time range from a relation time of the instant messaging account and its currently-related instant messaging user to a current time; and wherein content within the permission time range of the instant messaging account is being configured to be accessible to a user and/or a role related to the instant messaging account;

wherein said instant messaging account is configured to be related to a role only and said role is configured to be related to said instant messaging account only in a same period, wherein the role is independent being configured to be related to a user only during the same period, the user is configured to be related to the role or more roles, wherein the user is configured to obtain one or more permissions of the related one role or more roles.

15. A method for setting a permission time range of instant messaging content in a system, comprising:
- selecting a supervisor;
- setting one or more supervisees for the supervisor;
- setting a permission time range for the supervisor, wherein said permission time range comprises one or more of the following: a time range from a time point, which is determined by going backwards from a relation time of the instant messaging user and his/her currently-related instant messaging account for a fixed time length, to a current time, a time range from a time point, which is determined by going forwards from a relation time of the instant messaging user and his/her currently-related instant messaging account for a fixed time length, to a system initial time, a time range from a relation time of the instant messaging user and his/her currently-related instant messaging account to a system initial time, and a time range from a relation time of the instant messaging user and his/her currently-related instant messaging account to a current time; and
- wherein content within the permission time range in an instant messaging account or instant messaging accounts used by the one or more supervisees is being configured to be accessible to the selected supervisor;
- wherein the supervisor and each of the one or more supervisees is a user or a role, said instant messaging account is configured to be related to a role only and said role is configured to be related to said instant messaging account only in a same period, wherein the role is independent being configured to be related to a user only during the same period, and the user is configured to be related to the role or more roles, wherein the user is configured to obtain one or more permissions of the related one role or more roles.

16. A method for setting a permission time range of instant messaging content in a system, comprising:
- selecting a supervisee;
- setting a permission time range for the supervisee, wherein said permission time range comprises one or more of the following: a time range from a time point, which is determined by going backwards from a relation time of the instant messaging user and his/her currently-related instant messaging account for a fixed time length, to a current time, a time range from a time point, which is determined by going forwards from a relation time of the instant messaging user and his/her currently-related instant messaging account for a fixed time length, to a system initial time, a time range from a relation time of the instant messaging user and his/her currently-related instant messaging account to a system initial time, and a time range from a relation time of the instant messaging user and his/her currently-related instant messaging account to a current time; and
- wherein content within the permission time range in an instant messaging account used by the supervisee is being configured to be accessible to a supervisor corresponding to the selected supervisee;
- wherein the supervisor and the supervisee is a user or a role, said instant messaging account is configured to be related to a role only and said role is configured to be related to said instant messaging account only in a same period, wherein the role is independent being configured to be related to a user only during the same period, and the user is configured to be related to the role or more roles, wherein the user is configured to obtain one or more permissions of the related one role or more roles.

* * * * *